(No Model.)
F. POUDROUX.
ELECTRIC BATTERY.
No. 457,430. Patented Aug. 11, 1891.
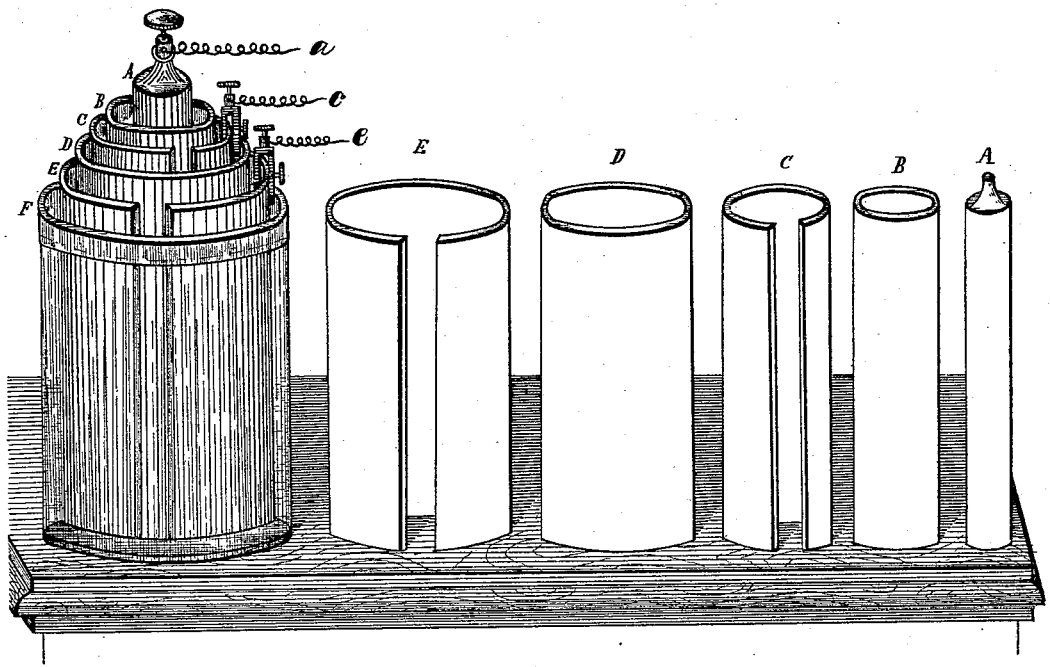

UNITED STATES PATENT OFFICE.

FLAVIEN POUDROUX, OF PARIS, FRANCE.

ELECTRIC BATTERY.

SPECIFICATION forming part of Letters Patent No. 457,430, dated August 11, 1891.

Application filed March 6, 1891. Serial No. 384,056. (No model.) Patented in France September 27, 1890, No. 208,495.

*To all whom it may concern:*

Be it known that I, FLAVIEN POUDROUX, a citizen of the French Republic, and a resident of Paris, in the said French Republic, have invented certain new and useful Improvements in Electric Batteries; and I do hereby declare the following to be a full, clear, and exact description of the invention, such as will enable others skilled in the art to which it appertains to make and use the same.

This invention has been patented in France by Letters Patent No 208,495, dated September 27, 1890.

The chief object of this invention is to solve the long-existing problem of a substitute for dynamos in electric lighting by providing a cheap, inodorous, inoffensive electric battery capable of supplying light enough for domestic uses.

To this end my invention consists in the construction and combination of parts and in the mixtures of ingredients and relative arrangements of solutions and elements hereinafter set forth and claimed.

In the accompanying drawing, the figure represents a perspective view of a concentric battery embodying my invention, the table-top on which it rests, and duplicates, also placed severally on said table-top, of the various interior parts of the said battery.

A designates a carbon cylinder, which forms the center of the battery and has a wire $a$ attached thereto; B, a porous cell or partition surrounding the said cylinder at an interval; C, a hollow cylinder of zinc similarly surrounding the said cell or partition and having a wire $c$ attached thereto; D, a porous vase or partition in like manner surrounding said hollow cylinder C; E, a hollow carbon cylinder having a wire $e$ attached thereto and in like manner surrounding the cell or partition C; and F, the external glass vase or jar which similarly surrounds the carbon cylinder E, and being provided with a bottom contains the operative parts of the battery. The cylindrical elements C E are slit from top to bottom; but the cylindrical cells or partitions B D are left with walls solid and unbroken. All of these interior concentric cylindrical parts are easily removable.

The space between carbon element A and partition B contains a depolarizing aqueous solution consisting of azotate of potash, binoxide of manganese, bichromate of soda, and sulphuric acid in the proportions, by weight, in the order named, of two-twentieths, one-twentieth, three-twentieths, and two-twentieths of the water employed. In the space immediately surrounding the zinc element C and within the cell or partition D is a liquid excitant consisting of an aqueous solution consisting of three parts, by weight, of chlorhydrate of ammonia and two of azotate of potash to twenty parts of water employed. In the space surrounding the carbon cylinder E is another depolarizing solution of bichromate of soda acidulated by one-tenth of its weight of sulphuric acid. The proportions above given of course need not be precisely adhered to.

Besides the advantages first above stated this battery creates in each element two distinct and constant currents, which are utilized in giving an energy hitherto unknown; also, I am able to employ a great surface of zinc in a cell of moderate capacity containing little liquid. The ingredients of the solutions are very cheap. One charging of the battery will suffice to fit it for working at least one hundred and eighty hours, except that one liquid only—that within the cell D—should be renewed every thirty hours. This is made the more easy by the construction of the battery, which allows both the elements and the partitions to be lifted out at will without otherwise disturbing the apparatus. The battery does not consume itself or wear its strength out when not in use, the zinc and carbon elements being lifted out of the solutions under such circumstances. The exciting solution being not at all acid, the zinc will last a long time after one coating with amalgam.

Having thus described my invention, what I claim as new, and desire to secure by Letters Patent, is—

1. In an electric battery, a carbon and zinc element having a solution between them consisting of azotate of potash, binoxide of manganese, bichromate of soda, and sulphuric acid in water in about the proportions stated, in combination with a second carbon element having between it and the zinc element an exciting solution consisting of chlorhydrate of ammonia and azotate of potash in about the proportions stated, and an outer inclosing cell or casing containing a second depolarizing solution in contact with the said second carbon element, substantially as set forth.

2. In an electric battery, a cylindrical hollow carbon element and a cylindrical hollow zinc element, each having an opening which will allow liquid to pass from the exterior thereof to the interior or the reverse, in combination with a central carbon element, interposed porous partitions or cells, and an exterior casing, the inner cell being provided with a depolarizing solution which consists of azotate of potash, binoxide of manganese, bichromate of soda, and sulphuric acid in the proportions given, the said solution first coming in contact with the inner carbon element, the second partition being provided with an exciting solution which first comes in contact with the zinc element and the space between the outer vase or casing, and the outer carbon element being provided with another depolarizing solution, substantially as set forth.

3. In an electric battery, a concentrically-arranged series of elements, the zinc being in the middle, the same being provided with an outer and inner depolarizing solution, and an interposed exciting solution consisting of three parts, by weight, of chlorhydrate of ammonia and two of azotate of potash to twenty parts of water, the said solution being in immediate contact with said zinc element, and the said solutions having access to each other through the partitions and elements, substantially as set forth.

In testimony that I claim the foregoing I have hereunto set my hand this 16th day of February, 1891.

FLAVIEN POUDROUX.

Witnesses:
EMILE KANTER,
GUILLAUME ANTHONISSEN.